US00RE44882E

(19) United States
(12) Reissued Patent
Otsuka et al.

(10) Patent Number: US RE44,882 E
(45) **Date of Reissued Patent: *May 6, 2014**

(54) DUAL DISPLAY PORTABLE TELEPHONE DEVICE AND ALLOCATION MEANS FOR DISPLAY PROCESS THEREOF

(75) Inventors: Shuji Otsuka, Osaka (JP); Hideji Kawasaki, Nayagawa (JP); Hiroomi Kashu, Moriguchi (JP)

(73) Assignee: Kyocera Corporation, Kyoto (JP)

( * ) Notice: This patent is subject to a terminal disclaimer.

(21) Appl. No.: 13/489,314

(22) Filed: Jun. 5, 2012
(Under 37 CFR 1.47)

Related U.S. Patent Documents

Reissue of:
(64) Patent No.: 6,941,160
Issued: Sep. 6, 2005
Appl. No.: 09/995,016
Filed: Nov. 27, 2001

U.S. Applications:
(62) Division of application No. 11/844,948, filed on Aug. 24, 2007, now Pat. No. Re. 43,561.

(30) Foreign Application Priority Data

Nov. 30, 2000 (JP) ..... 2000-366353
Jun. 22, 2001 (JP) ..... 2001-190123

(51) Int. Cl.
*H04B 1/38* (2006.01)

(52) U.S. Cl.
USPC ..... 455/566; 455/556; 455/550.1; 455/575.3; 455/90.3; 455/439; 345/102; 345/108; 345/902; 345/903; 345/905

(58) Field of Classification Search
USPC ..... 455/575.3–575.4, 566–567, 439; 345/102, 173, 168–169, 902–905
See application file for complete search history.

(56) References Cited

U.S. PATENT DOCUMENTS

| | | | | |
|---|---|---|---|---|
| 5,467,102 | A | | 11/1995 | Kuno et al. |
| 5,901,222 | A | * | 5/1999 | Macor ..... 379/433.04 |
| 6,069,593 | A | | 5/2000 | Lebby et al. |
| 6,069,648 | A | * | 5/2000 | Suso et al. ..... 348/14.02 |
| 6,144,358 | A | * | 11/2000 | Narayanaswamy et al. .. 345/102 |
| 6,297,945 | B1 | | 10/2001 | Yamamoto |
| 6,343,006 | B1 | | 1/2002 | Moscovitch et al. |
| 6,411,278 | B1 | | 6/2002 | Kage et al. |
| 6,418,325 | B1 | | 7/2002 | Reber et al. |
| 6,424,369 | B1 | | 7/2002 | Adair et al. |

(Continued)

FOREIGN PATENT DOCUMENTS

| | | |
|---|---|---|
| JP | 02-151128 | 6/1990 |
| JP | 07-029627 | 1/1995 |

(Continued)

*Primary Examiner* — Kiet Doan
*Assistant Examiner* — Michael T Vu

(57) ABSTRACT

The present invention is a portable telephone device that is composed of two displays of substantially a same size, and can continuously perform two display processes in parallel by allocating different display processes to each of the displays.

3 Claims, 8 Drawing Sheets

(56) References Cited

U.S. PATENT DOCUMENTS

| | | | | |
|---|---|---|---|---|
| 6,466,202 | B1 | 10/2002 | Suso et al. | |
| 6,486,890 | B1 | 11/2002 | Harada et al. | |
| 6,577,496 | B1 | 6/2003 | Gioscia et al. | |
| 6,590,618 | B1 | 7/2003 | Park et al. | |
| 6,643,124 | B1 | 11/2003 | Wilk | |
| 6,662,244 | B1 | 12/2003 | Takahashi | |
| 6,792,293 | B1 * | 9/2004 | Awan et al. | 455/566 |
| 2002/0044425 | A1 | 4/2002 | Ijas et al. | |
| 2003/0006942 | A1 | 1/2003 | Searls et al. | |

FOREIGN PATENT DOCUMENTS

| | | |
|---|---|---|
| JP | 07-029627 | 2/1995 |
| JP | 08-030530 | 2/1996 |
| JP | 10-257090 | 9/1998 |
| JP | 10-309376 | 11/1998 |
| JP | 2000-059853 | 2/2000 |
| JP | 2000-172395 | 6/2000 |
| JP | 2000-353357 | 12/2000 |
| JP | 2001-069223 | 3/2001 |
| JP | 2001-160063 | 6/2001 |

* cited by examiner

DUAL DISPLAY PORTABLE TELEPHONE DEVICE AND ALLOCATION MEANS FOR DISPLAY PROCESS THEREOF

Matter enclosed in heavy brackets [ ] appears in the original patent but forms no part of this reissue specification; matter printed in italics indicates the additions made by reissue.

*CROSS-REFERENCE TO RELATED APPLICATIONS*

*Notice: More than one reissue application has been filed for the reissue of U.S. Pat. No. 6,941,160. This is a reissue divisional application of U.S. Ser. No. 11/844,948, filed on Aug. 24, 2007 now U.S. Pat. No. Re. 43,561 which is a reissue application of U.S. Pat. No. 6,941,160 issued on Sep. 6, 2005.*

BACKGROUND OF THE INVENTION (1) Field of the Invention

The present invention relates to portable telephone devices, and in particular to portable telephone devices which have a function for displaying e-mail and the like.

(2) Description of the Related Art

Recently portable, telephone devices are becoming increasingly multifunctional, with their displays being used for displaying information about callers and incoming-calls, length of calls, the date, the time, e-mail (electronic mail), telephone directories, Internet web pages, games, photographic images, and so on.

However, since conventional portable telephone has only one display, when a user uses a plurality of the portable telephone's functions, the user run each of the programs corresponding to the functions through a menu screen. For example, to extract names, addresses, e-mail addresses and the like about senders of e-mail (electronic mail) displayed by the portable telephone device when creating a telephone directory of the senders, the user must repeatedly run programs for executing the e-mail display function and the telephone directory display function alternately. This causes a problem that it takes much time to run the programs and that switching between the functions is complicated.

SUMMARY OF THE INVENTION

In view of the stated problem, the object of the present invention is to provide a portable telephone device that is capable of executing two display processes in parallel.

Here, "display process" denotes a process for outputting display data generated according to execution of programs for calls, receiving incoming-calls, and stand-by display, and menu programs for e-mail creation, e-mail display, the telephone directory, games, and so on. "Display data" denotes images (including moving images), character data, and the like.

In order to realize this objective, the present invention is (A) a portable telephone device including: two displays of substantially a same size; and an allocation unit for allocating a different display process to each of the displays, wherein each display process is a process for outputting different display data including at least one of image data and character data. (B) Furthermore, in (A) the displays may be positioned so that display content on each of the displays is visible in one field of vision.

According to the stated construction the user can use two displays, therefore different display processes can be executed in parallel.

(C) Here, in (B) the allocation unit may include: a storage unit for storing a table showing a correspondence between each of the displays and the display process being allocated thereto; a specification unit for specifying a display process to be allocated to one of the displays; a selection unit for selecting, according to the correspondence shown in the table, one of the displays to allocate the specified display process to; and an updating unit for updating the table so as to show the correspondence between the selected display and the specified display process, wherein the allocation unit allocates the specified display process to the selected display.

According to the stated construction, the display to which a display process is newly allocated is selected in response to the correspondence between the displays and the display processes allocated thereto, therefore the user can use the displays effectively.

(D) Here, in (C) the specification unit may include: a detection unit for detecting a call signal, wherein the specification unit, on detecting the call signal, specifies a display process which outputs display data forming an image showing to a communication state and which is to be newly allocated to one of the displays; and the selection unit may include: a judgement unit for judging, based on the table, whether a state of either of the displays is one of (a) having no display process allocated thereto, and (b) having a display process outputting the display data forming an image of stand-by display allocated thereto, wherein the selection unit, when the judgement unit judges the state of one of the displays to be one of (a) and (b), selects the display as a display to which the specified display process is to be newly allocated. (E) Furthermore, in (D) the communication state may be one of an incoming-call being received, electronic mail having been received, and a call in progress.

According to the stated construction, even if a call is received while a display process is being executed on one of the displays, a display process for outputting image data showing the "communication state", for example "receiving call", is displayed on a display which is either unallocated or to which the stand-by display process outputting the image data showing that the portable telephone is on stand-by is allocated. Therefore the user can continue the on-going display process such as displaying an input mail message while answering the call.

(F) Here, in (D) the selection unit may further include: a saving unit for saving, when the state of the displays is not one of (a) and (b), data being displayed on one of the displays, wherein the selection unit selects the display whose data has been saved as a display to which the specified display process is to be newly allocated. (G) Furthermore, in (F) the communication state may be one of an incoming-call being received, electronic mail having been received, and a call in progress.

According to the stated construction, even if display processes are being executed on both the displays when a call is received, one of the display processes allocated to one of the displays is interrupted and the display data displayed on the displays is saved and the display process outputting the display data showing the communication state "receiving call" is allocated to the interrupted display, therefore the user can answer the call without losing the data that was being displayed on the interrupted screen.

(H) Here, in (F) the selection unit may further include: a restoration unit for restoring, on completion of the specified display process, the saved data on the display on which the specified display process has ended. (I) Furthermore, in (H)

the communication state may be one of an incoming-call being received, electronic mail having been received, and a call in progress.

According to the stated construction, the saved display data is restored, therefore the user, immediately after finishing the call, can start the display process that was being executed.

(J) Here, in (C) the specification unit may include: an instruction receiving unit for receiving an operation instruction from a user, the specification unit specifying, a display process to be newly allocated to a display from a plurality of display processes, according to the operation instruction; and the selection unit may include: a judgement unit for judging, based on the table, whether a state of either of the displays is one of (a) having no display process allocated thereto, and (b) having a display process outputting the display data forming an image of stand-by display allocated thereto, wherein the selection unit, when the judgement unit judges the state of one of the displays to be one of (a) and (b), selects the display as a display to which the specified display process is to be newly allocated. (K) Furthermore, in (J) the plurality of display processes may include a display process which outputs the display data forming an image relating to at least one of electronic mail, a game, telephone directory creation, and a photograph.

According to the stated construction, the user can select a desired display process, and the selected display process can be executed on the display.

(L) Here, in (B) the allocation unit may allocate a display process which outputs the display data forming an image showing a communication state to one of the displays, and may allocate another display process to the other display. (M) Furthermore, in (C) the allocation unit may allocate, as the other display process, a display process which outputs the display data forming an image relating one of electronic mail, a game, and telephone directory creation.

According to the stated construction, the user can execute another display process such as e-mail creation, games, and so on, while on a call. Furthermore, the user can transmit the e-mail created during the call immediately after the call ends.

(N) Here, in (B) the allocation unit may include: a selection instruction reception unit for receiving from the user a selection instruction for selecting, from the displays having a different display process allocated thereto, a display to respond to user display instructions; and a display selection unit for selecting, according to the selection instruction, a display to respond to user display instructions. (O) Furthermore, in (C) the allocation unit may include: a selection instruction reception unit for receiving from the user a selection instruction for selecting, from the displays having a different display process allocated thereto, a display to respond to user display instructions; and a display selection unit for selecting, according to the selection instruction, a display to respond to user display instructions. (P) In (O) the specification unit may include: an instruction receiving unit for receiving an operation instruction from a user, the specification unit specifying, a display process to be newly allocated to a display from a plurality of display processes, according to the operation instruction; and the selection unit may include: a judgement unit for judging, based on the table, whether a state of either of the displays is one of (a) having no display process allocated thereto, and (b) having a display process outputting the display data forming an image of stand-by display allocated thereto, wherein the selection unit, when the judgement unit judges the state of one of the displays to be one of (a) and (b), selects the display as a display to which the specified display process is to be newly allocated. (Q) In (P) the plurality of display processes may include a display process which outputs the display data forming an image relating to at least one of electronic mail, a game, telephone directory creation, and a photograph.

According to the stated construction, the user can select the display for inputting as necessary, therefore two display processes can be executed in parallel and effectively using the two displays.

(R) In (N), the selection instruction reception unit may include at least one selection key for receiving the selection instruction, and receives the selection instruction by the selection key being continuously operated for a set amount of time. (S) Furthermore, in (O) the selection instruction reception unit may include at least one selection key for receiving the selection instruction, and receives the selection instruction by the selection key being continuously operated for a set amount of time. (T) Furthermore, in (P) the selection instruction reception unit may include at least one selection key for receiving the selection instruction, and receives the selection instruction by the selection key being continuously operated for a set amount of time.

According to the stated construction, the user can switch with a simple operation between the selection of the display for inputting. Furthermore, when there are a plurality of selection keys, the selection key can be specified even more quickly.

(U) Here, in (R) the allocation unit may further include: a position storing unit which stores cursor position information, the cursor position information showing a position of a cursor on a display screen of the selected display; a position updating unit for updating, each time the cursor is moved according to a user display instruction, the cursor position information into cursor position information which shows a position to which the cursor has been moved, and the display selection unit further has the cursor displayed, according to the selection instruction, in the position shown in the position information stored in the position storing unit. (V) Furthermore, in (S) the allocation unit may further include: a position storing unit which stores cursor position information, the cursor position information showing a position of a cursor on a display screen of the selected display; a position updating unit for updating, each time the cursor is moved according to a user display instruction, the cursor position information into cursor position information which shows a position to which the cursor has been moved, and the display selection unit further has the cursor displayed, according to the selection instruction, in the position shown in the position information stored in the position storing unit. (W) Furthermore, in (T) the allocation unit may further includes: a position storing unit which stores cursor position information, the cursor position information showing a position of a cursor on a display screen of the selected display; a position updating unit for updating, each time the cursor is moved according to a user display instruction, the cursor position information into cursor position information which shows a position to which the cursor has been moved, and the display selection unit further has the cursor displayed, according to the selection instruction, in the position shown in the position information stored in the position storing unit.

According to the stated construction, when the selection of the display for input is switched, the position of the cursor before the switch is stored, and when the selection of the display is switched again the cursor is displayed in the position that it was displayed in before the switch, therefore the user can be saved the effort of moving the cursor to the desired position each time the selection of the display for input is switched.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

The following describes an embodiment of the present invention in detail with reference to the drawings.

Figure 1:
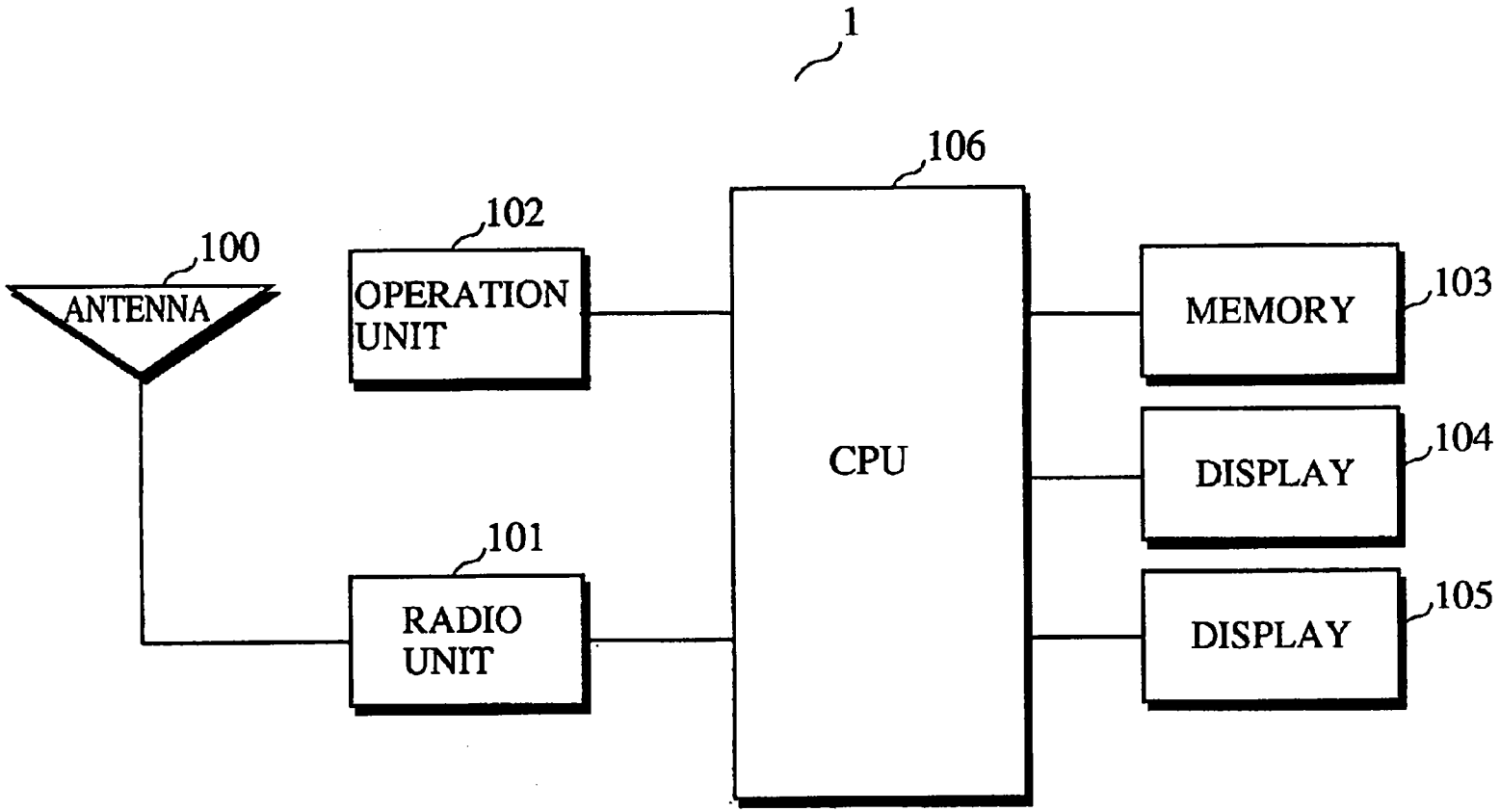
FIG. 1 shows the structure of the main components of a portable telephone device 1 of the present embodiment.

FIG. 1 shows the structure of the main components of a portable telephone device 1 of the present embodiment. The portable telephone device 1 is composed of an antenna 100, a radio unit 101, an operation unit 102, a memory 103, display 104, a display 105, and a CPU (central processing unit) 106.

The radio unit 101 receives radio signals via the antenna 100, demodulates the received signals to data, and outputs the data to the CPU 105.

Figure 2:
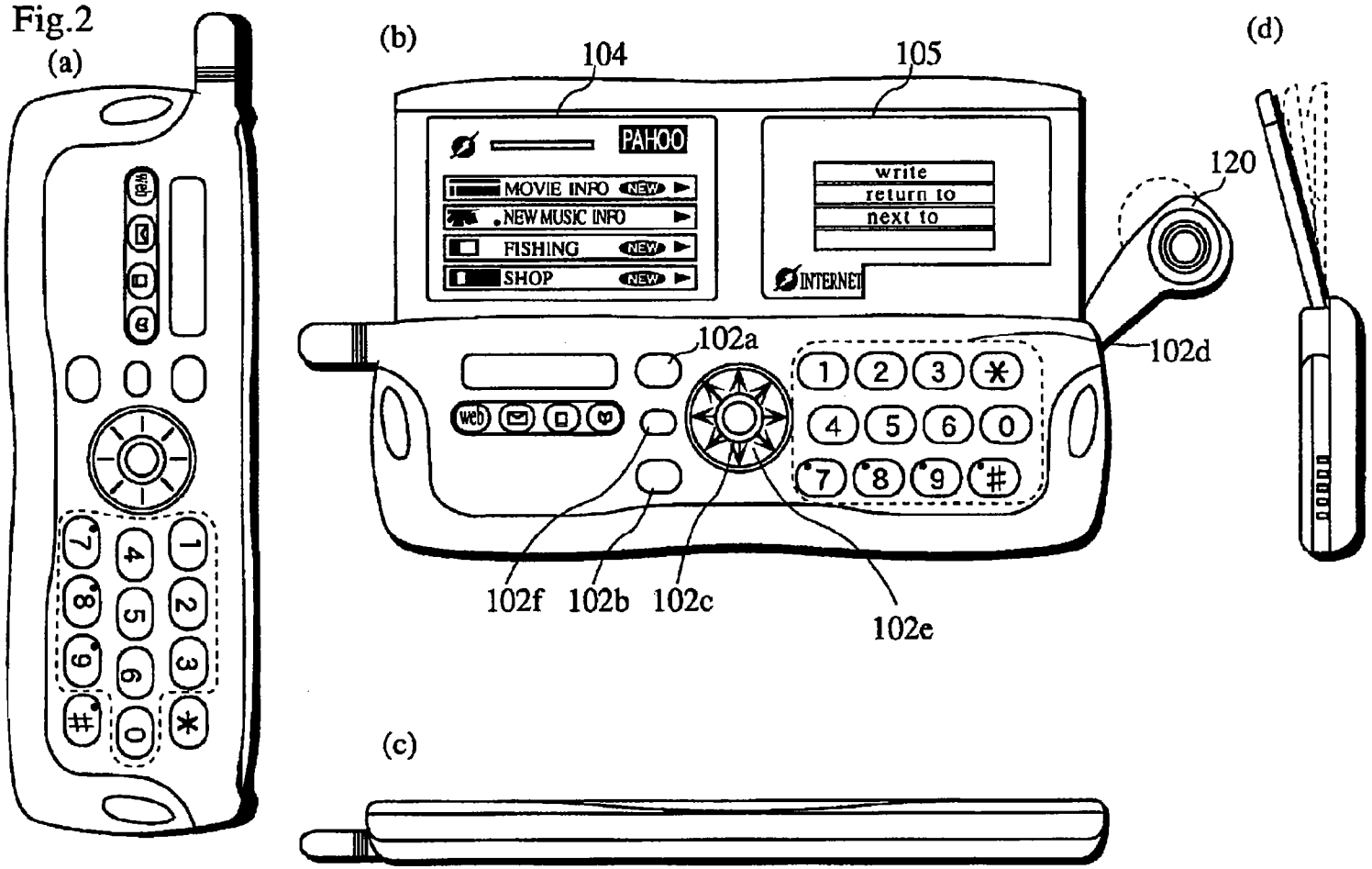
FIG. 2 shows outer views of the telephone device 1.

FIG. 2 shows outer views of the portable telephone device 1. In FIG. 2, (a) shows a front view of the portable telephone device in a folded state, (b) shows a front view of the portable telephone device in an unfolded state, (c) shows a side view of the portable telephone device 1 in the same state as (a), and (d) shows a side view of the portable telephone device 1 in the same state as (b).

The operation unit 102, as shown in FIG. 2, includes a call start key 102a, a call end key 102b, a selection key 102c, a character input key unit 102d, and a cursor moving key 102e.

The call start key 102a is for inputting a call signal that notifies the start of a call to the CPU 106.

The call end key 102b is for inputting a call end signal that notifies the end of a call to the CPU 106.

The selection key 102c is a key for inputting a command for instructing the CPU 106 to read a menu program from the memory 103. While the mail creation program is executed, the selection key 102c also has the function of inputting a transmission command to the CPU 106 for transmitting created mail.

The character input key unit 102d is for inputting characters and numbers, and includes numeric keys 0 to 9. A corresponding character list is allocated to each numeric key.

The cursor moving key 102e is for instructing movements of the cursor to the CPU 106, and is also a display selection key.

Here, the display selection key receives, by being pressed for a set time, selection instructions to select the display to respond to display instructions from the user for character and number input and so on (hereinafter "user display instructions"), and notifying the CPU 106 of the instructions.

The memory 103 stores programs for calls, incoming-communication, and stand-by display, menu programs for e-mail creation, e-mail display, the telephone directory, games and the like, a correspondence table showing the correspondence between each display and the display process allocated thereto, and position information about the cursor, and so on.

Here, "display process" denotes a process for outputting display data generated according to execution of one of the above-described programs. "Display data" denotes images (including moving images), character data, and the like.

Here, the correspondence in the aforementioned correspondence table in an initialization state when the portable telephone device is turned on shows that one display is displaying an image showing that the portable terminal is on stand-by (a stand-by screen), while the other is unallocated. The correspondence table is updated each time the CPU 106 newly allocates a display process to one of displays to show the correspondence therebetween. Alternatively, both displays may be unallocated in the initial state.

Furthermore, unassigned denotes that a display process is not assigned to the display, for example, the display is blank.

The display 104 and the display 105, as shown in FIG. 2, are the same size, and are provided next to each other so that they can be visually recognized in the same field of vision when the user's line of vision is fixed. The displays 104 and 105 display display data which is outputted by the display processes that the CPU 106 allocates to each of the displays respectively.

The CPU 106 gives display instructions to the displays 104 and 105, allocates display processes to the displays 104 and 105, and performs selection processes for the display to receive user display operations.

First, display instructions are described. The CPU 106, in response to a user display instruction, instructs display of the display content instructed by the user on the display that the user selected by pressing the display selection key.

Specifically, the CPU 106 reads from the memory 103 a character list which corresponds to the key input, selects the character which corresponds to the number of times that the numeric key was pressed from the character list, and has the selected character displayed on the display which has been selected by the user pressing the display selection key.

Next, the allocation of the display process to the displays is described. The CPU 106, in response to a signal of a telephone call (hereinafter "call signal" denotes either an incoming or an outgoing call signal, unless otherwise specified) or in response to an operation instruction from the user, allocates the corresponding display processes to the display 104 and the display 105.

Specifically, the CPU 106 performs the following process.

On detecting a call signal, the CPU 106 reads the corresponding table from the memory 103, and, by referring to the correspondence shown in the correspondence table, judges whether the display state of either the display 104 or the display 105 is either that of being unallocated or having a stand-by display process is allocated. Then, based on the result of the judgement, the CPU 106 allocates the call display process to one of the displays, and updates the correspondence table stored in the memory 103 so that the call display process and the allocated display are corresponded therein.

Furthermore, on detecting an operation instruction from the user to read a menu program, the CPU 106 reads the correspondence table from the memory 103, and by referring to the correspondence shown in the correspondence table, judges whether there is a display which is unallocated or to which the stand-by display process is allocated. When the judgement is affirmative, the CPU 106 allocates the display process of the menu program whose reading was instructed according to the operation instruction to that display, and updates the correspondence table stored in the memory 103 so that the allocated display and the display process of the menu program are in correspondence. When the judgement is negative, the CPU 106 stops the menu program.

Next, the selection process for selecting the display which responds to user display instructions is described. The CPU 106, in response to the cursor key 102e being continuously pressed down, selects a display to receive user display instructions.

Specifically, on detecting that the cursor key 102e has been pressed down for a set amount of time, the CPU 106 selects a display to respond to user display instructions, reads the cursor position information from the memory 103, and moves the cursor to the position shown in the read position information.

Figure 3:
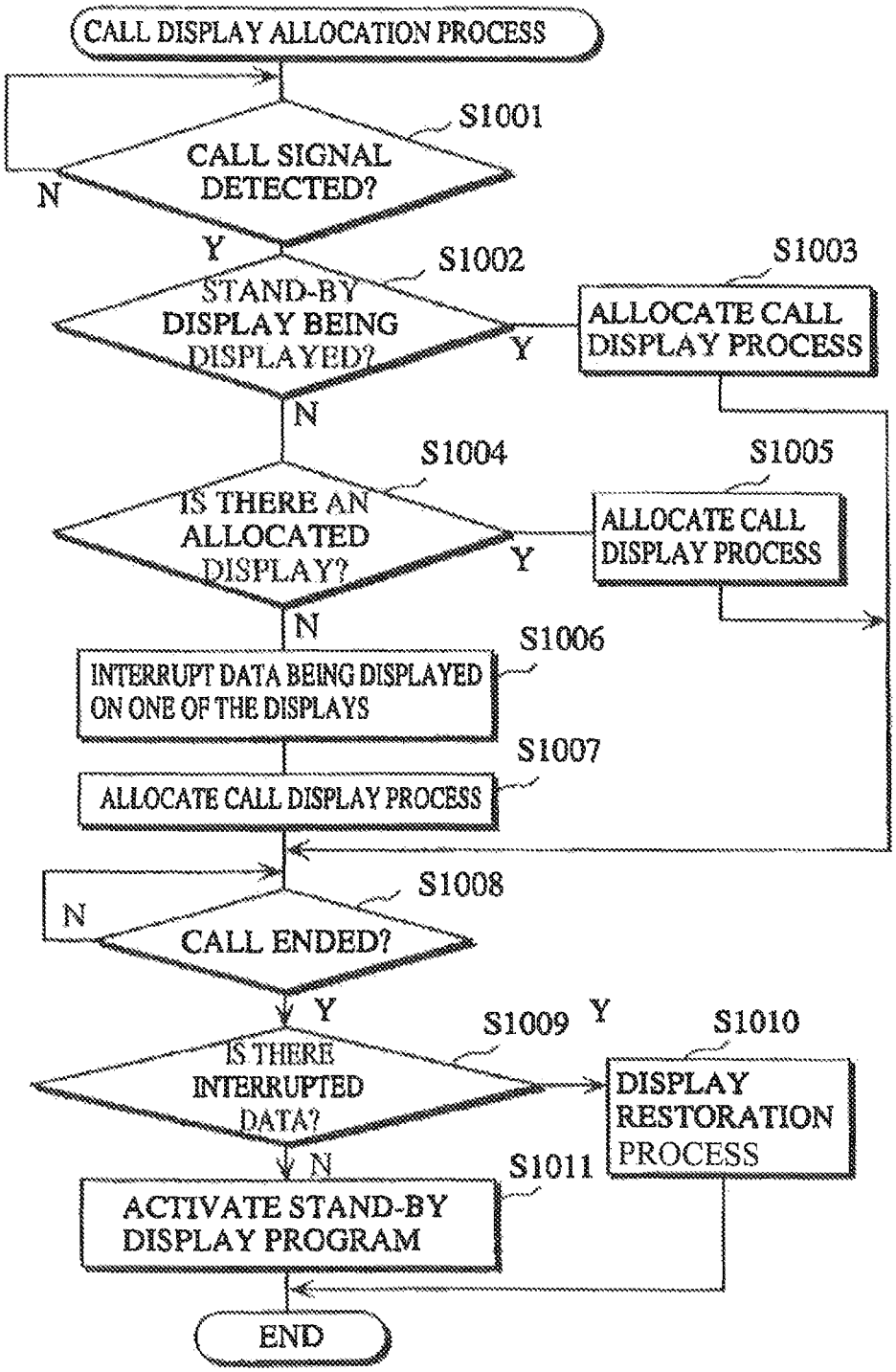
FIG. 3 is a flowchart showing the operation by the CPU 106 for allocating a display process to a display when the CPU 106 detects a call signal.

FIG. 3 is a flowchart showing the operation performed by the CPU 106 for allocating a display process to a display, when the CPU 106 detects a call signal. On detecting a call signal being output from the radio unit 101 (S1001:Y), the CPU 106 retrieves the correspondence table from the memory 103, and by referring to the correspondence shown in the correspondence table, judges whether there is a display which is displaying the stand-by display (S1002). If the judgement is affirmative (S1002:Y), the CPU 106 reads out the call program, and allocates the display process executed based on the call program to the display (S1003). Then the CPU 106 updates the correspondence table so that the allocated display process and the call display process are in correspondence.

When there is no display that is displaying the stand-by display (S1102:N), the CPU 106, by referring to the correspondence which is shown in the correspondence table, judges whether there is an unallocated display (S1004). If the judgement is affirmative (S1004:Y), the CPU 106 reads out the call program, allocates to the display the display process executed based on the call program (S1005), and updates the correspondence table so that the allocated display process and the call display process are in correspondence.

When there is no unallocated display (S1004:N), the CPU 106 interrupts the display process of one of the displays, and after saving the display data (S1006), reads out the call program, allocates the display process executed based on the call program to the display (S1007), and updates the correspondence table so that the allocated display and the call display process are in correspondence.

In the above, "one of the displays" denotes a display selected according to an operation of the display selection key.

On detecting a call end signal (S1008:Y), the CPU 106 judges whether there is any saved display data (S1009), and when the judgement is affirmative (S1009:Y), the CPU 1006 restores the saved data on the display (S1010), and updates the correspondence table so that the display and the restored display process are corresponded.

When there is no saved data (S1009:N), the CPU 106 reads out the stand-by display program (S1011), has the stand-by screen displayed, and updates the correspondence table so that the display which is displaying the stand-by display and the stand-by display process are in correspondence.

Here, although not shown in the flowchart in FIG. 3, when an incoming-call display process is allocated to one of the displays and a call signal for answering an incoming-call is detected, the CPU 106 allocates the call display process to the same display to which the incoming-call display process is allocated, and updates the correspondence table stored in the memory 103 so that the allocated display and the call display process are in correspondence.

Figure 6:
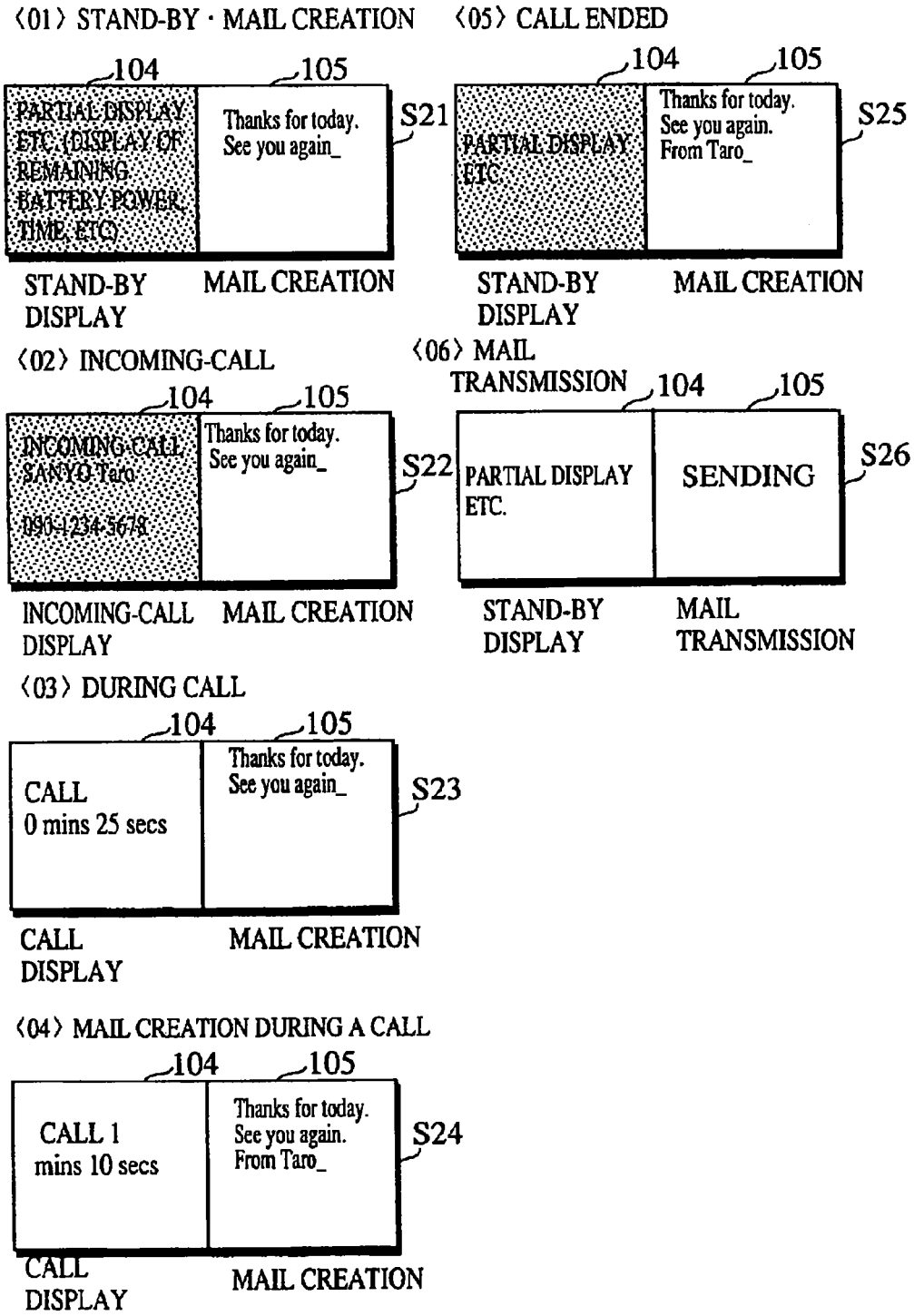
FIG. 6 shows display examples of the display 104 and the display 105.

FIG. 6 shows display examples of the display 104 and the display 105 in the aforementioned case. In the display examples in FIG. 6, the display 104 is displaying the stand-by display, and the display 105 is displaying the main body of an e-mail (FIG. 6, S21). Therefore, the CPU 106, on detecting an incoming-call signal, reads out the incoming-call program, and allocates the incoming-call display process to the display 104 (FIG. 6 S22, FIGS. 3 S1002, S1003).

On detecting that the call key 102a has been pressed, the CPU 106 reads out the call program, and allocates the call display process to the display 104 which is displaying the incoming-call display (FIG. 6, S23).

On detecting character input from the character input key unit 102d, the CPU 106 has the input character displayed on the display 105 (FIG. 6, S24). On detecting that the call end key 102b has been pressed (FIG. 3, S1007:Y), the CPU 106 reads out the stand-by program (FIG. 3, S1010), and has the stand-by display displayed on the display 104 (FIG. 6, S25). On detecting that the selection key 102c has been pressed, the CPU 106 transmits the created e-mail (FIG. 6, S26).

In this way, in the present embodiment when an incoming-call is received while e-mail is being created, the two displays display different contents. Therefore, the user can continuously perform mail creation operations while on a call, and transmit the created mail soon after the call has finished, as shown in FIG. 6, S26. Note that in the present embodiment, characters for mail creation are input while the user is on a call by using a hands free set or a hand set earphone for the call.

Figure 4:
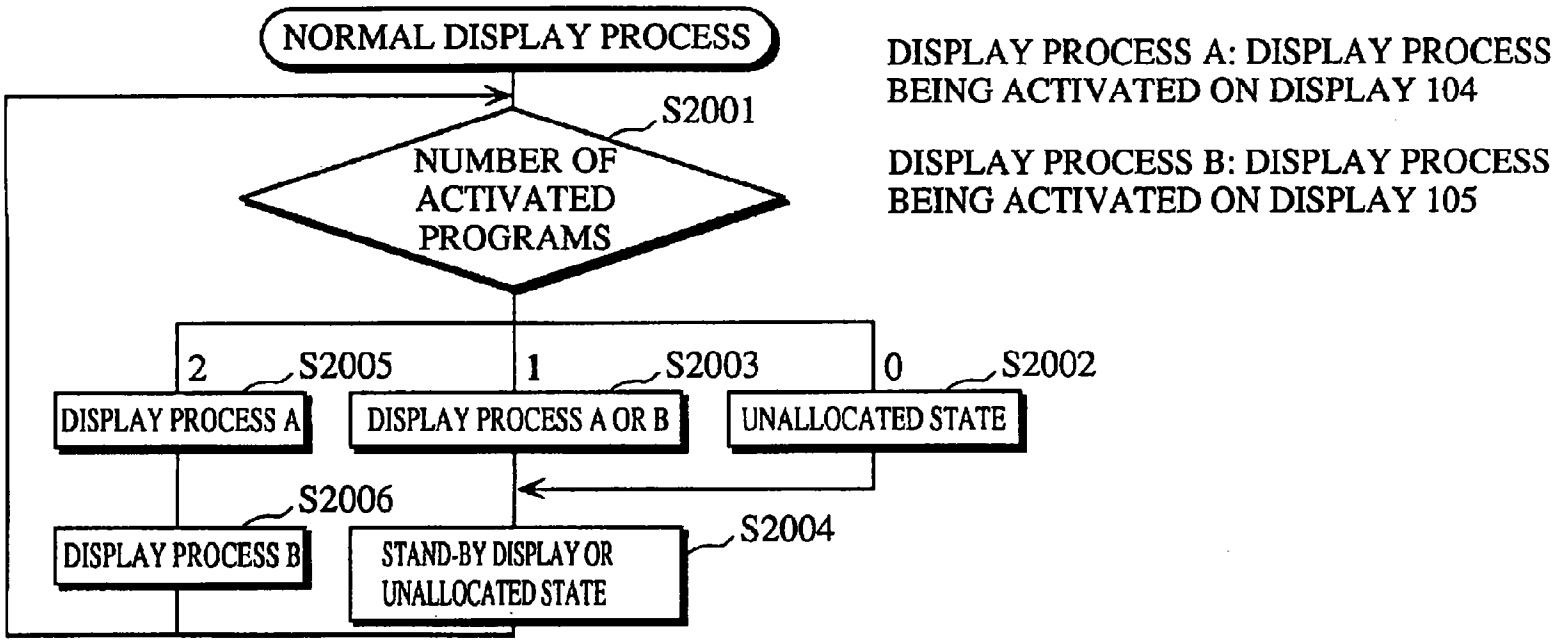
FIG. 4 is a flowchart showing the operation by the CPU 106 for allocating a display process to a display when the CPU 106 detects a signal other than a call signal.

Next, operations by the CPU 106 for allocating display processes to the displays in cases other than calls are described. FIG. 4 shows the operations by the CPU 106 for allocating display processes to the displays in such cases.

When the number of read menu programs is 0, the CPU 106 controls one of the displays to be in an unallocated state (S2002), and has the other display display the stand-by display (S2004). When the number of read programs is 1, the CPU 106 allocates the display process based on the read program to one display (S2003), and has the other display display the stand-by display or controls the other display to be in an unallocated state (S2004). When the number of read menu programs is 2, the CPU 106 allocates the display processes based on the read menu programs to the display 104 and the display 105 (S2005, S2006).

The following describes operations by the CPU 106 for, in response to a menu selection operation by the user, reading out the corresponding menu program from the menu programs stored in the memory 103, and allocating the read menu program to the display 104 and the display 105.

Figure 5:
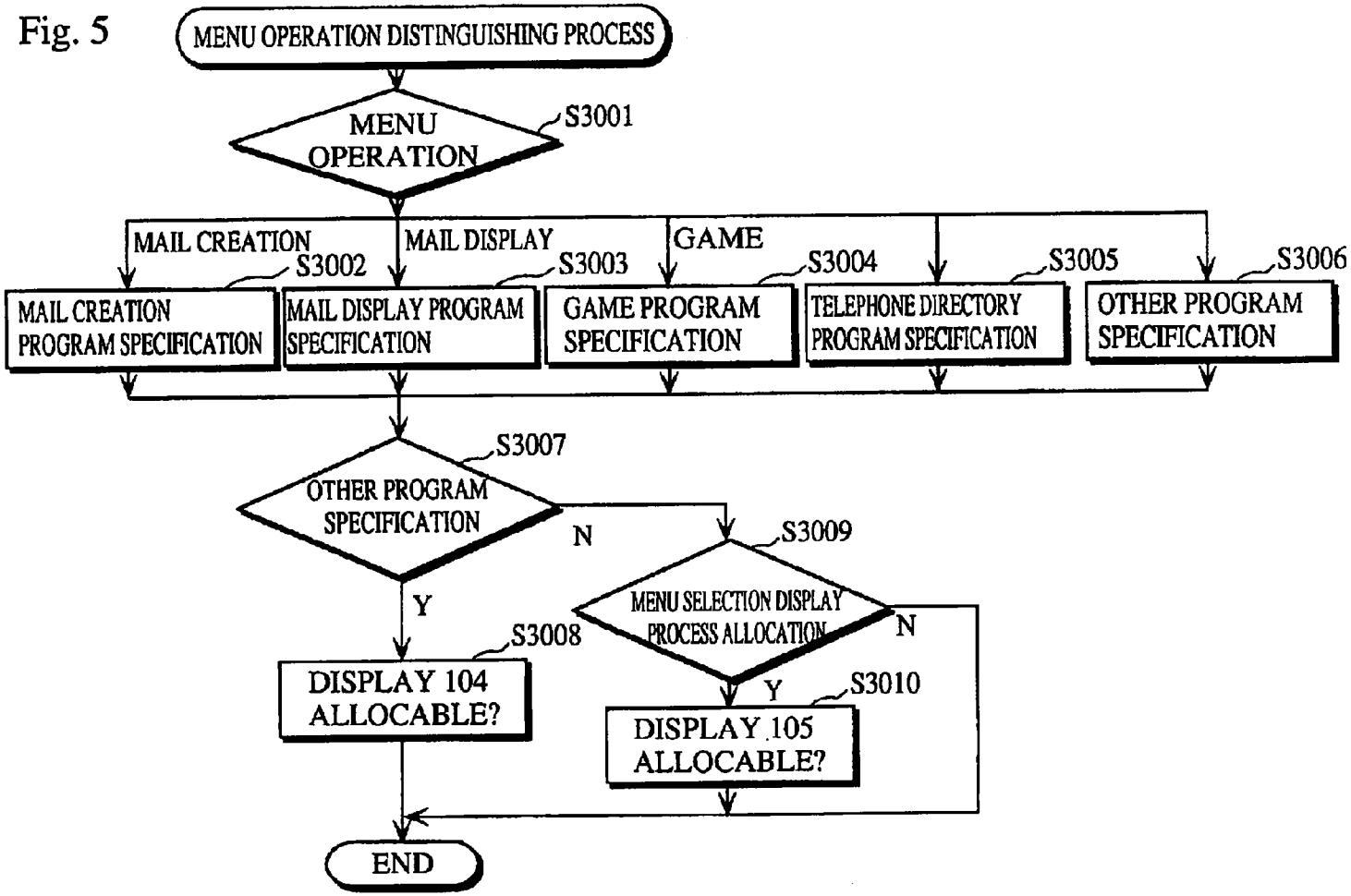
FIG. 5 shows the operation by the CPU 106 for allocating the display process to a display in response to a menu selection operation.

FIG. 5 shows operations by the CPU 106 for allocating display processes to the displays in response to the aforementioned menu selection operation. On receiving an operation instruction to read a menu program from the memory 103, according to the user pressing the menu selection key 102c (S3001:Y), the CPU 106 selects one menu program to read from the memory 103 in response to the operation instruction (S3002, or S3003, or S3004, S3005, or S3006). The CPU 106 reads the correspondence table from the memory 103, and on judging, by referring to the correspondence shown in the correspondence table, that the display 104 is unallocated or displaying the stand-by display (hereinafter "allocable") (S3007:Y), the CPU 106 allocates the display process based on the menu program to the display 104 (S3008), and updates the correspondence table so that the allocated display and the display process based on the menu program are in correspondence.

The CPU 106 reads the correspondence table from the memory 103, and when the CPU 106 judges, by referring to the correspondence shown in the correspondence table, that the display 104 is not allocable (S3007:N), it judges whether the display 105 is allocable (S3009). When the CPU 106 judges that the display 105 is allocable (S3009:Y), it reads out the menu program, performs an allocation process to allocate the menu program to the display 105 (S3010), and updates the correspondence table so that the allocated display and the display process based on the menu program are in correspondence therein.

When the CPU 106 judges that the display 105 is not allocable (S3008:N), it cancels reading of the menu program.

Figure 7:
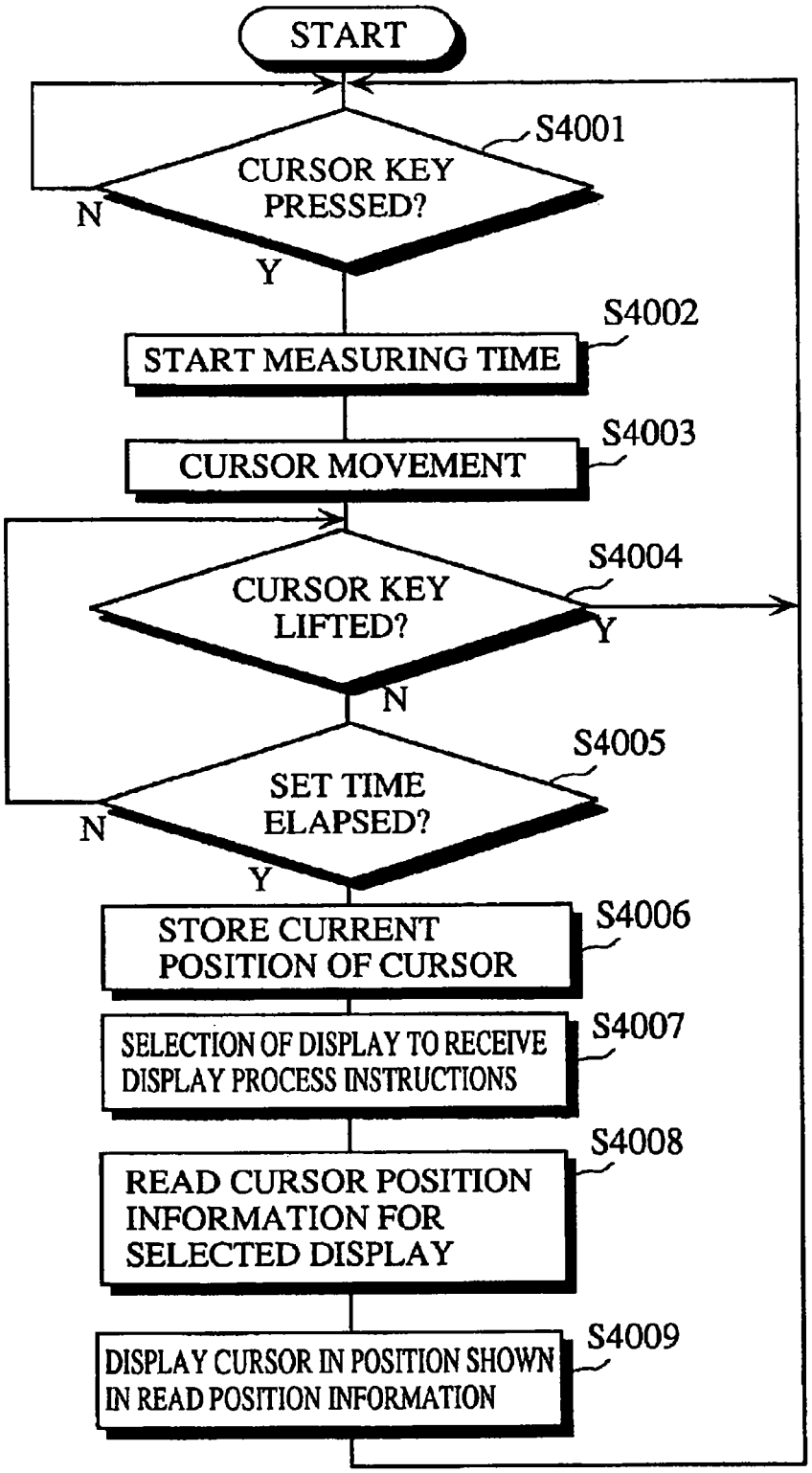
FIG. 7 is a flowchart showing the operation for switching the display to receive user input operations, after a display process is allocated.

The following describes operations by the CPU 106 for switching display selection according to user instruction after a display process has been allocated to each of the display 104 and the display 105. FIG. 7 is a flowchart showing the aforementioned operations.

Here, for explanation's sake, it will be supposed that the display 104 has been selected as the display to respond to user instructions, and that display processes which involve cursor display have been allocated to the two displays. On detecting that the cursor moving key 102e is being pressed (S4001:Y), the CPU 106 starts measuring the length of time for which the cursor is pressed (S4002), and moves the cursor of the display 104 (S4003). When the cursor moving key 102e key is not lifted (S4004:N) and continues to be pressed down for a set amount of time (S4005), the CPU 106 stores position information which shows the current position of the cursor on the screen (hereinafter "position information A") in correspondence with the display 104 in the memory 103 (S4006). Furthermore, the CPU 106 selects the display 105 as the display to respond to user display instructions (S4007), reads position information showing the most recent position of the cursor on the display 105 (hereinafter "position information B") which was stored in the memory 103 in the same manner as at step S400 (S4008), and has the cursor displayed in the position shown by the read position information B (S4009). By repeating the aforementioned operations, the cursor can be displayed in the most recent position based on the position information A or B, even if display selection is performed repeatedly.

Here, the position information B is set to a default value when the display process which accompanies cursor display on the display 105 is read out, and is updated each time a user display instruction is received. When the allocated display process ends, the cursor information B is initialized to the default value. Furthermore, when a display process in which cursor display is not involved is allocated, the operations in FIG. 7 steps 54003, S4006, S4008, and S4009 are skipped.

Figure 8:
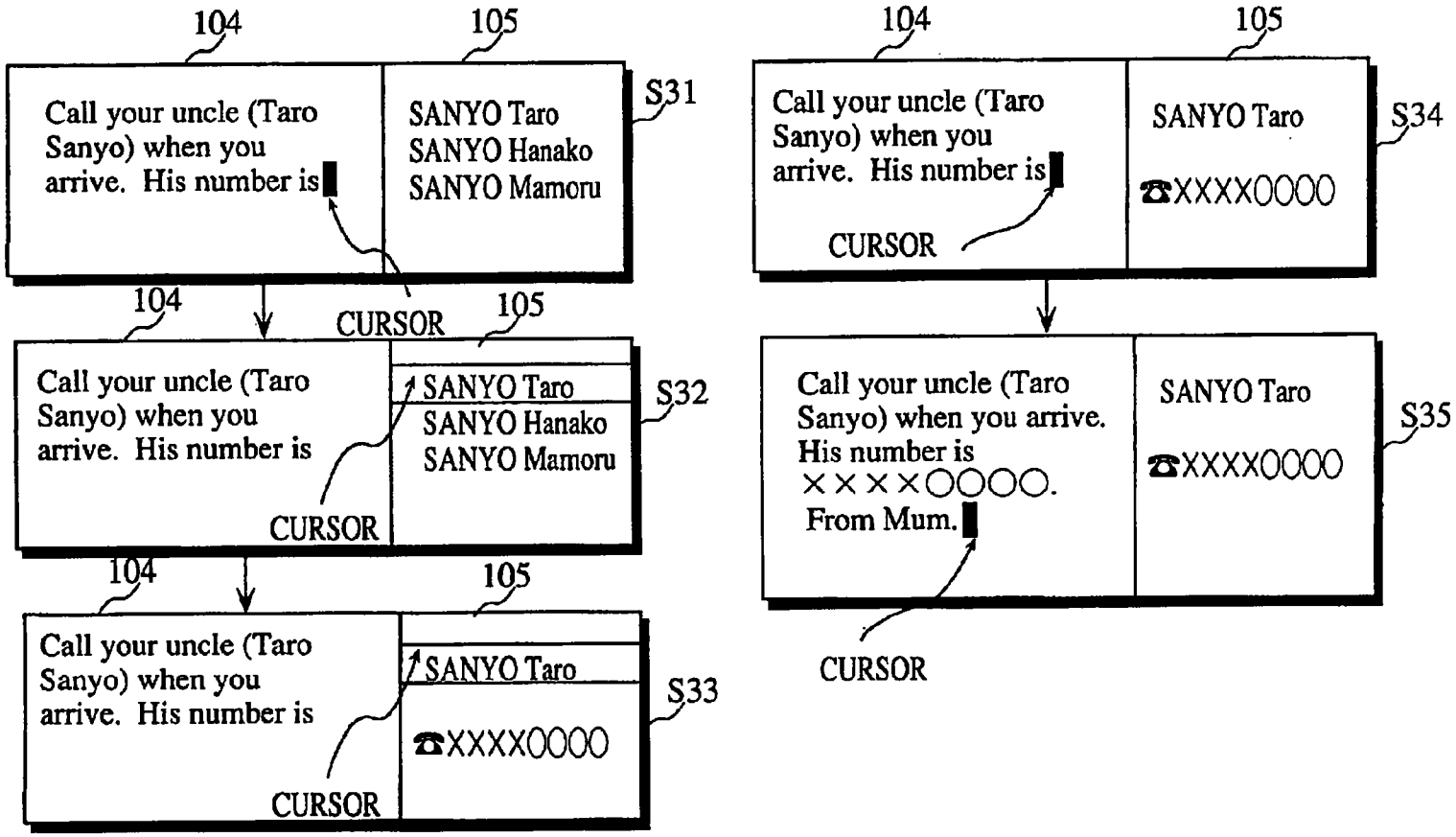
FIG. 8 shows display examples of the display 104 and the display 105 in the flowchart in FIG. 7.

FIG. 8 shows display examples of the display 104 and the display 105 in the flowchart in FIG. 7. In the display in FIG. 8 the display process based on the mail creation program is allocated to the display 104, the display process based on telephone directory program is allocated to the display 105, and the display 104 is selected as the display to respond to user display instructions (FIG. 8, S31).

When the cursor moving key 102e is pressed down continuously for the predetermined time (S4005), the CPU 106 records in the memory 103 position information A (hereinafter called "information A") showing the current position of the cursor on the display screen in correspondence with the display 104 which is displaying the screen (S4006). (Here, the position information A is position information regarding the cursor displayed on the display 104 shown in FIG. 8, S31.) Next, the display 105 is selected as the display to respond to user display information (S4007), and the CPU 106 reads position information B (hereinafter called "information B") recorded in the memory 103 according to the same step as that of S4001. Information B shows the most recent position of the cursor on the display 105 before being selected (S4008). The CPU 106 has the cursor displayed in the position shown in the read position information B (the cursor position shown in FIG. 8, S32) (S4009). On receiving a user display instruction for "SANYO Taro" which the cursor is on, the CPU 106 has the display screen S33 in FIG. 8 displayed.

When the cursor moving key 102e is further continuously pressed down for the set time (S4005), the CPU 106 stores in the memory 103 position information showing the current position of the cursor on the screen in correspondence with the display 105 which is displaying the screen. (Here, the cursor position is the position shown in FIG. 8, S33). Furthermore, the CPU 106 selects the display 104 as the display to respond to user display instructions (S4007), reads, according to a process the same as that at step S4006, position information showing the most recent position (the cursor position shown in FIG. 8, S31) of the cursor on the display 104 (S4008), and displays the cursor in the position shown in the read position information (S4009, FIG. 8, S34). On receiving a user display instruction, the CPU 106 has the instructed display content displayed, as shown in FIG. 8, S35.

An embodiment of the present invention is described here, but the present invention is of course not limited to this embodiment.

For example, although in the present embodiment the two displays are the same size, is not necessary for them to be so. It is sufficient to have two displays which are recognizable to the naked eye as being substantially the same size. Furthermore, the two displays need not be the same shape. For example, one display may be square and the other oval.

Furthermore, the operations performed while a call is in progress are not limited to creation of e-mail. For example, the operations may be a game or creation of the telephone directory. A game or a telephone directory program is selected in the menu at S3001 in FIG. 5, the CPU 106 executes the selected display process on one display, leaves one display unallocated, and executes the call display process on the unallocated display, as shown in FIG. 3. This makes it possible for the user to play a game or create a telephone directory during a call. Furthermore, by providing a camera in the position shown by 120 in FIG. 2, it is also possible to take photos during a call. Furthermore, by storing the images of the photos in the memory 103 and adding an image display program to the menu in FIG. 5, it is possible to look at photos during a call by performing the same kind of operations as with the aforementioned game and telephone directory.

Furthermore, in the flowchart in FIG. 3, when a call is detected, the CPU 106 reads out the call program and allocates the display process of the read program, but in addition to the aforementioned case, similarly when an incoming-mail signal is detected the display process based on the mail display program may be allocated forcedly to one of the displays.

According to this when a new e-mail is received, the user can see the content of the mail straight away, therefore the user can act promptly when an urgent e-mail is received.

Furthermore, in the present embodiment the two-screen display can be used in cases other than calls. For example, when both displays are unallocated, the mail display program (FIG. 5, S3003) is first selected with the menu selection operation in FIG. 5, S3001, and e-mail display process is allocated to the display 104. Next, the telephone directory is selected with the menu selection operation, and the telephone directory creation display process is allocated to the display 105. According to this operation, the content of the received mail can be displayed on the display 104 and the telephone directory displayed on the display 105. As a result, the user can refer to the name, address, and e-mail address being displayed on the display 104 while registering them in the telephone directory.

Note that although in the present embodiment the cursor moving key 102e in the operation unit 102 is assigned as the display selection key, any other key in the operation unit may be assigned as the display selection key. Furthermore, it is possible to have not only one but a plurality of display selection keys. For example, in addition to the cursor movement key 102e, the selection key 102c may be assigned as a display selection key, and all or some of the keys of the character input key unit 102d may be assigned as display selection keys.

Furthermore, the portable telephone device may have a construction in which the user may switch as necessary between displaying on the first display and displaying on the second display, by providing a screen switching key in the operation unit 102.

Furthermore, the portable telephone device may have a construction in which the display is switched automatically between the first display and the second display according to the display processes. For example, the second display may be switched to automatically in the case of the display process of the mail creation program, and the first display is the case of the display process for a game program.

Furthermore, in the present embodiment the portable telephone device may be constructed to have a key that is used solely as a display key, such as that shown by 102d in FIG. 2, so that the user can select to which display a display process that has been read through a menu selection operation is allocated.

Furthermore, the operation keys included in the operation unit 102 may be push-button keys, rotating keys, or touch-panel keys.

Furthermore, although in the present embodiment there are two displays which display display processes the display 104 and the display 105, the number of displays is not limited to two, and there may be three or more.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

[1. A portable telephone device comprising:

two displays of substantially a same size, positioned so that display content on each of the displays is visible in one field of vision; and allocation means for allocating a different display process to each of the displays, each display process being a process for outputting different display data including at least one of image data and character data, wherein the allocation means includes:

a storage unit for storing a table showing a correspondence between each of the displays and the display process being allocated thereto;

a specification unit for specifying a display process to be allocated to one of the displays;

a selection unit for selecting, according to the correspondence shown in the table, one of the displays to allocate the specified display process to; and an updating unit for updating the table so as to show the correspondence between the selected display and the specified display process;

the specification unit includes:

a detection unit for detecting a call signal, wherein the specification unit, on detecting the call signal, specifies a display process which outputs display data forming an image showing to a communication state and which is to be newly allocated to one of the displays; and the selection unit includes:

a judgement unit for judging, based on the table, whether a state of either of the displays is one of (a) having no display process allocated thereto, and (b) having a display process outputting the display data forming an image of stand-by display allocated thereto, wherein the selection unit, when the judgement unit judges the state of one of the displays to be one of (a) and (b), selects the display as a display to which the specified display process is to be newly allocated, and the allocation means allocates the specified display process to the selected display.]

[2. The portable telephone device of claim 1 wherein the selection unit further includes:

a saving unit for saving, when the state of the displays is not one of (a) and (b), data being displayed on one of the displays, wherein the selection unit selects the display whose data has been saved as a display to which the specified display process is to be newly allocated.]

[3. The portable telephone device of claim 2 wherein the selection unit further includes:

a restoration unit for restoring, on completion of the specified display process, the saved data on the display on which the specified display process has ended.]

[4. The portable telephone device of claim 3 wherein the communication state is one of an incoming-call being received, electronic mail having been received, and a call in progress.]

[5. The portable telephone device of claim 1 wherein the communication state is one of an incoming-call being received, electronic mail having been received, and a call in progress.]

[6. The portable telephone device of claim 2 wherein the communication state is one of an incoming-call being received, electronic mail having been received, and a call in progress.]

*7. A portable telephone device comprising:*

*two displays provided next to each other;*

*an allocation control unit configured to control allocation of display processes to the displays based on an allocation state of a display process to each display, wherein the allocation control unit includes a judgment unit configured to judge whether a stand-by display process has been allocated to any one of the two displays provided next to each other; and*

*a detection unit configured to detect an incoming call, wherein*

*when the judgment unit judges that a stand-by display process has been allocated to one of the two displays provided next to each other at a time of detection of the incoming call, and the allocation control unit allocates, to the display to which the stand-by display process has been allocated, an incoming call display process for indicating that an incoming call is being received, wherein*

*when the stand-by display process has not been allocated to any of the two displays provided next to each other, the*

*judgment unit further judges whether any one of the two displays has no display process allocated thereto, and when any one of the two displays provided next to each other has no display process allocated thereto, the allocation control unit allocates, to the display that has no display process allocated thereto, the incoming call display process for indicating that an incoming call is being received, and*

*when any display processes have been allocated to the two displays provided next to each other, the allocation control unit allocates, to any one of the two displays provided next to each other, the incoming call display process for indicating that an incoming call is being received.*

*8. The portable telephone device of claim 7, further comprising:*

*an instruction receiving unit configured to receive a call start instruction from a user, wherein*

*when the stand-by display process has been allocated to any one of the two displays provided next to each other at a time of reception of the call start instruction, the allocation control unit allocates, to the display to which the stand-by display process has been allocated, a call display process for indicating that a call is in progress.*

*9. The portable telephone device of claim 7, further comprising:*

*an instruction receiving unit configured to receive a call start instruction from a user, wherein*

*when any one of the two displays provided next to each other has no display process allocated thereto at a time of reception of the call start instruction, the allocation control unit allocates, to the display that has no display process allocated thereto, a call display process for indicating that a call is in progress.*

* * * * *